(12) United States Patent
Cheng et al.

(10) Patent No.: US 9,404,816 B1
(45) Date of Patent: Aug. 2, 2016

(54) MULTIFUNCTIONAL LOAD TEST DEVICE

(71) Applicant: HIWIN MIKROSYSTEM CORP., Taichung (TW)

(72) Inventors: Chi-Yuan Cheng, Taichung (TW); Wei-Cheng Wang, Taichung (TW); Tzu-Hsiang Hung, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 0 days.

(21) Appl. No.: 14/732,707

(22) Filed: Jun. 6, 2015

(51) Int. Cl.
*G01L 1/04* (2006.01)

(52) U.S. Cl.
CPC ........................................ *G01L 1/04* (2013.01)

(58) Field of Classification Search
CPC ........... G01L 1/04; G01L 3/1471; G01L 3/24; H02P 6/001; H20P 6/14; H20P 6/18

USPC ............ 73/862.621, 862.31, 862; 318/400.3, 318/400.01, 700

See application file for complete search history.

(56) References Cited

U.S. PATENT DOCUMENTS

| | | | |
|---|---|---|---|
| 7,948,115 B2* | 5/2011 | Henle | D06F 33/02 307/12 |
| 2004/0075541 A1* | 4/2004 | Simoneau | B60R 25/06 340/426.11 |

* cited by examiner

*Primary Examiner* — Lisa Caputo
*Assistant Examiner* — Nigel Plumb
(74) *Attorney, Agent, or Firm* — Guice Patents PLLC

(57) ABSTRACT

A multifunctional load test device includes a drive, a motor to be tested, a load motor and an inverter. The drive is electrically connected to civil power. The motor to be tested is electrically connected to the drive and powered by the drive and controllably drivable by the drive. The load motor is drivable by the motor to be tested to produce counter electromotive force. The inverter is electrically connected to the load motor to rectify the counter electromotive force into power identical to civil power.

4 Claims, 4 Drawing Sheets

MULTIFUNCTIONAL LOAD TEST DEVICE

BACKGROUND OF THE INVENTION

1. Field of the Invention

The present invention relates generally to a test device, and more particularly to a multifunctional load test device.

2. Description of the Related Art

FIG. 4 shows a conventional load test device mainly including a drive 91, a motor 92 to be tested and a load component 93. The load component 93 can be a decelerator and life test system or an electromagnetic brake. The drive 91 is powered by civil power to drive the motor 92 to operate. By means of the load component 93 loaded on the motor 92, the load test can be performed to achieve a result.

However, no matter whether the load component 93 is a decelerator and life test system or an electromagnetic brake, the load component 93 only has the function of testing the lifetime of the motor 92, while unable to produce any product for application. This needs to be improved.

SUMMARY OF THE INVENTION

It is therefore a primary object of the present invention to provide a multifunctional load test device. When the load motor is driven by the motor to be tested to operate, the load motor produces counter electromotive force. An inverter is electrically connected to the load motor to rectify the counter electromotive force into power identical to civil power. The power is output for use so as to save energy.

To achieve the above and other objects, the multifunctional load test device of the present invention includes: a drive electrically connected to civil power; a motor to be tested, the motor being electrically connected to the drive and powered by the drive and controllably drivable by the drive; a load motor having a transmission shaft connected with an output shaft of the motor to be tested by a shaft coupler, the load motor being drivable by the motor to be tested to produce counter electromotive force; and an inverter electrically connected to the load motor to rectify the counter electromotive force into power identical to civil power.

In the above multifunctional load test device, the inverter is inbuilt with a rectification component, a boosting component and a frequency conversion component, which are sequentially electrically connected with each other. The counter electromotive force in the form of AC power is modulated by the rectification component into DC power and boosted by the boosting component and then modulated by the frequency conversion component into AC power.

In the above multifunctional load test device, the drive is a pre-drive, while the inverter is a post-drive. The post-drive is electrically connected to the load motor. The post-drive is inbuilt with a switch component and a rectification component connected with each other in series. The power is modulated by the rectification component into DC form and then modulated by the switch component into AC form and then output to the load motor as the power for driving the load motor.

In the above multifunctional load test device, the post-drive is provided with a regenerative resistor electrically connected to the switch component for consuming residual power output from the switch component.

The present invention can be best understood through the following description and accompanying drawings, wherein:

DETAILED DESCRIPTION OF THE PREFERRED EMBODIMENTS

Figure 1:
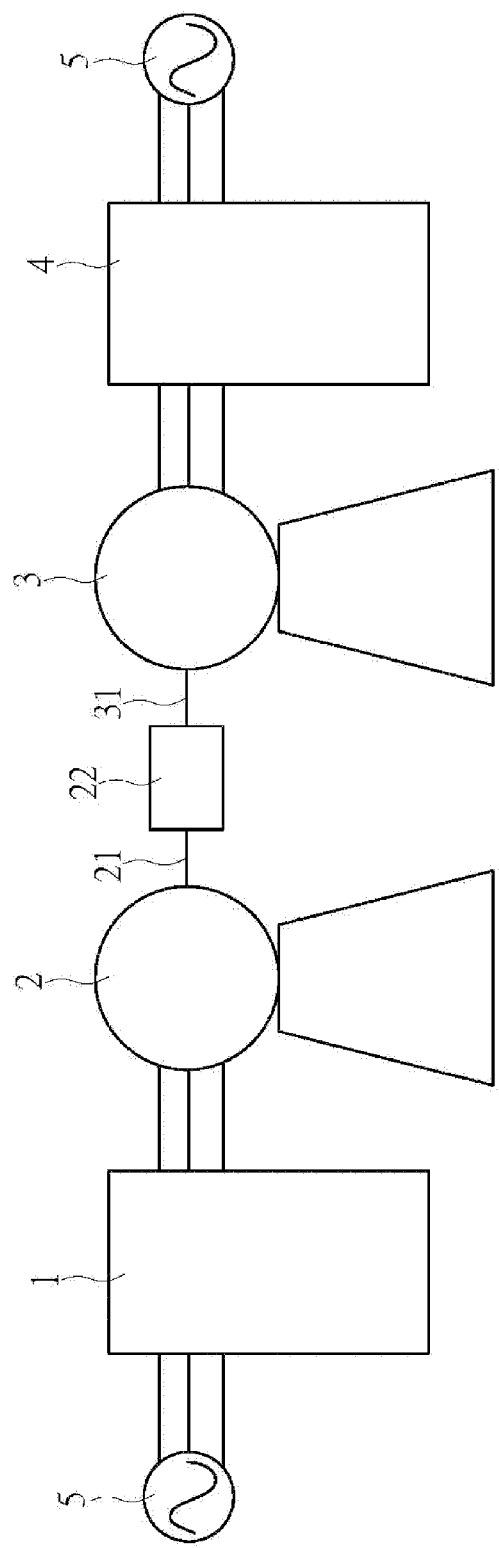
FIG. 1 is a schematic diagram of a first embodiment of the load test device of the present invention.

Please refer to FIG. 1. According to a first embodiment, the multifunctional load test device of the present invention includes a drive 1, a motor 2 to be tested, a load motor 3 and an inverter 4.

As shown in FIG. 1, the drive 1 is electrically connected to civil power 5. The motor 2 to be tested is electrically connected to the drive 1 and powered by the drive 1 and controllably drivable by the drive 1. The load motor 3 has a transmission shaft 31 connected with the output shaft 21 of the motor 2 by a shaft coupler 22. The load motor 3 is drivable by the motor 2 to produce counter electromotive force. The inverter 4 is electrically connected to the load motor 3 to rectify the counter electromotive force into power identical to civil power. In this embodiment, the achieved power is further fed into the civil power for use.

Figure 2:
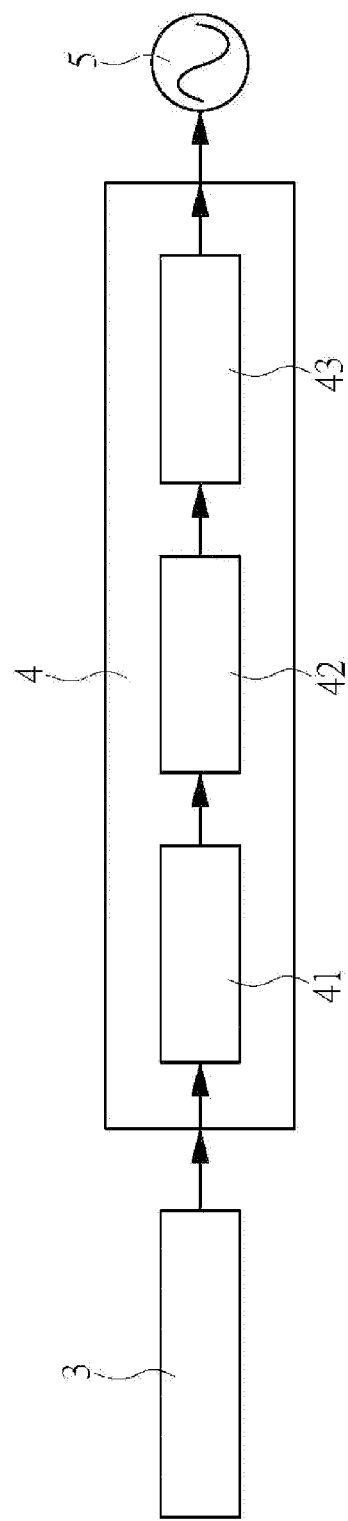
FIG. 2 is a schematic diagram showing the arrangement of the internal component of the inverter of the first embodiment of the load test device of the present invention.

As shown in FIG. 2, the inverter 4 of the present invention is inbuilt with a rectification component 41, a boosting component 42 and a frequency conversion component 43, which are sequentially electrically connected with each other. The power identical to civil power is achieved in such a manner that the counter electromotive force in the form of AC power is modulated by the rectification component 41 into DC power and boosted by the boosting component 42 and then modulated by the frequency conversion component 43 into AC power.

It can be found from the above that the load test device of the present invention is advantageous in that the load test device is applicable to a motor with an output shaft and a drive to perform burnout test. When testing the motor 2 to be tested, the load motor 3 connected to rear end of the motor 2 can be driven to operate and produce counter electromotive force as a generator. Moreover, by means of the inverter, the counter electromotive force can be rectified and modulated into power identical to civil power. Accordingly, the power can be utilized to save energy. In addition, the device can be used to perform overheating and over-current protection test for the drive.

Figure 3:
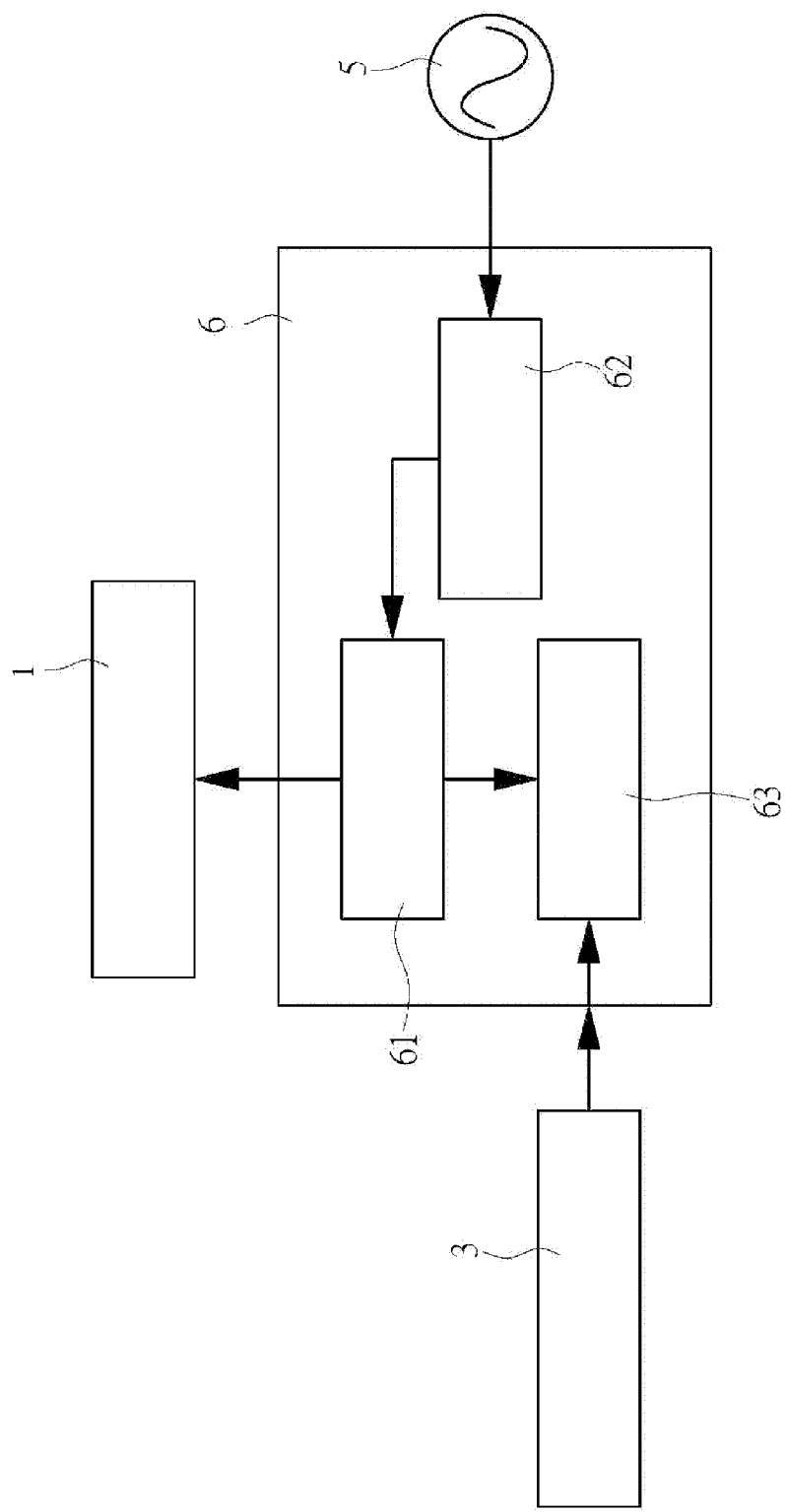
FIG. 3 is a schematic diagram showing the arrangement of the internal component of the post-drive of a second embodiment of the load test device of the present invention.
Figure 4:
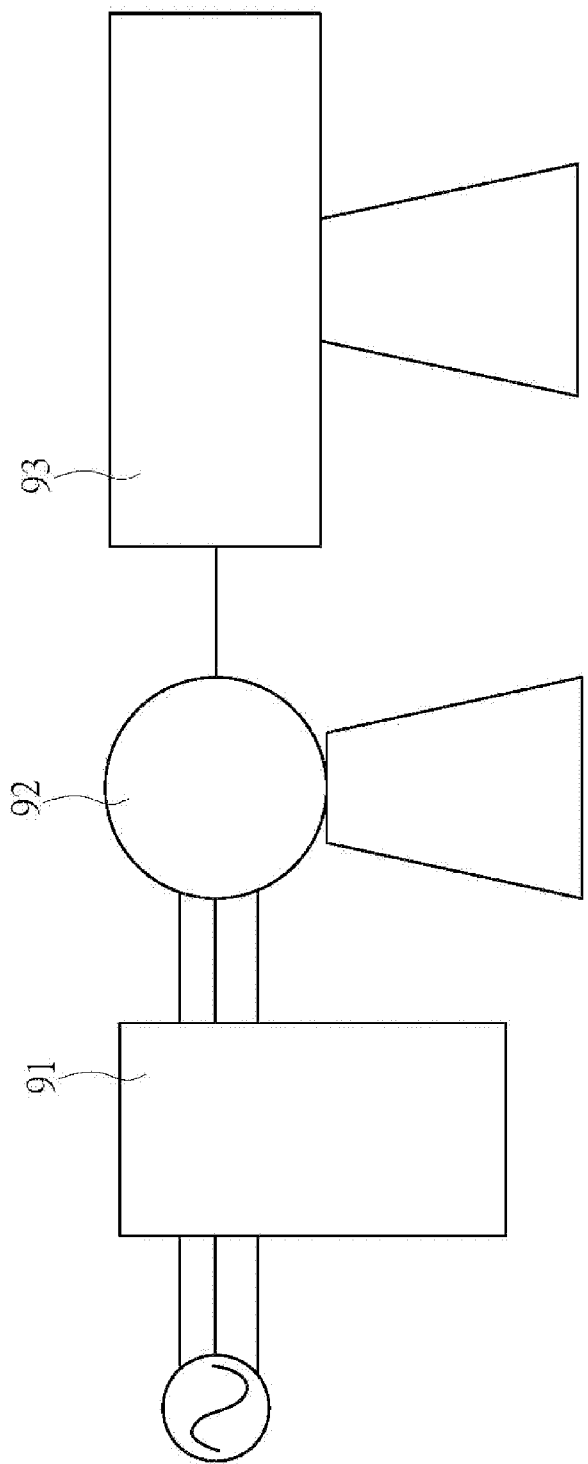
FIG. 4 is a schematic diagram of a conventional load test device.

Certainly, many modifications of the above embodiment can be made without departing from the spirit of the present invention. FIG. 3 shows a second embodiment of the present invention. The second embodiment is mainly different from the first embodiment in that in the second embodiment, the inverter is another drive 6. That is, the drive 1 is positioned on front side as a pre-drive, while the drive 6 is positioned on rear side as a post-drive. The drive 6 is electrically connected to the load motor 3 and the drive 6 is inbuilt with a switch component 61 and a rectification component 62 connected with each other in series.

In this embodiment, the load test device is also powered by civil power 5 and the load motor 3 produces counter electromotive force as in the first embodiment. The counter electromotive force is modulated by the rectification component 62 into DC form and then modulated by the switch component 61 into AC form and then output to the load motor 3 as the power for driving the load motor 3. The DC power is also bed back to the pre-drive 1 as the power for driving the motor 2 to be tested. In addition, in this embodiment, the drive 6 is provided with a regenerative resistor 63 electrically connected to the switch component 61 for consuming the residual power output from the switch component 61.

Accordingly, the load motor 3 is driven by the motor 2 to be tested to produce counter electromotive force. The counter electromotive force is modulated by the switch component 61 and the rectification component 62 of the drive 6 to achieve power for directly powering the pre-drive 1. This can achieve the object of energy-saving as the first embodiment.

The above embodiments are only used to illustrate the present invention, not intended to limit the scope thereof. Many modifications of the above embodiments, for example, change of number or replacement with equivalent component can be made without departing from the spirit of the present invention.

What is claimed is:

1. A multifunctional load test device comprising:
    a drive electrically connected to civil power;
    a motor to be tested, the motor being electrically connected to the drive and powered by the drive and controllably drivable by the drive;
    a load motor having a transmission shaft connected with an output shaft of the motor to be tested by a shaft coupler, the load motor being drivable by the motor to be tested to produce counter electromotive force; and
    an inverter electrically connected to the load motor to rectify the counter electromotive force into power identical to civil power.

2. The multifunctional load test device as claimed in claim 1, wherein the inverter is inbuilt with a rectification component, a boosting component and a frequency conversion component, which are sequentially electrically connected with each other, the counter electromotive force in the form of AC power being modulated by the rectification component into DC power and boosted by the boosting component and then modulated by the frequency conversion component into AC power.

3. The multifunctional load test device as claimed in claim 1, wherein the drive is a pre-drive, while the inverter is a post-drive, the post-drive being electrically connected to the load motor, the post-drive being inbuilt with a switch component and a rectification component connected with each other in series, the power being modulated by the rectification component into DC form and then modulated by the switch component into AC form and then output to the load motor as the power for driving the load motor, the DC power being also bed back to the pre-drive as the power for driving the motor to be tested.

4. The multifunctional load test device as claimed in claim 3, wherein the post-drive is provided with a regenerative resistor electrically connected to the switch component for consuming residual power output from the switch component.

* * * * *